(12) United States Patent
Back, Sr.

(10) Patent No.: US 6,592,189 B1
(45) Date of Patent: Jul. 15, 2003

(54) SKATE WHEEL

(76) Inventor: Forest Hiram Back, Sr., 8750 Frederick Pike, Dayton, OH (US) 45414

( * ) Notice: Subject to any disclaimer, the term of this patent is extended or adjusted under 35 U.S.C. 154(b) by 0 days.

(21) Appl. No.: 10/104,661

(22) Filed: Mar. 22, 2002

(51) Int. Cl.[7] ................................................ B60B 9/12
(52) U.S. Cl. ............................... 301/5.308; 301/5.304; 152/47
(58) Field of Search ........................... 301/5.301, 5.302, 301/5.303, 5.304, 5.305, 5.306, 5.307, 5.308, 5.309, 5.7; 152/323, 47, 48, 5, 6, 7

(56) References Cited

U.S. PATENT DOCUMENTS

| | | | |
|---|---|---|---|
| 1,486,865 A | * | 3/1924 | Decker .................... 152/48 |
| 1,499,809 A | * | 7/1924 | Duke ...................... 152/47 |
| 3,348,597 A | * | 10/1967 | Goldberg et al. .............. 152/7 |
| 3,895,844 A | | 7/1975 | Merbler |
| 4,040,670 A | * | 8/1977 | Williams ................ 301/5.301 |
| 4,219,240 A | * | 8/1980 | Brandenstein et al. ....... 301/5.7 |
| 4,383,244 A | | 5/1983 | Knauff |
| 4,699,432 A | | 10/1987 | Klamer |
| 5,129,709 A | | 7/1992 | Klamer |
| 5,265,659 A | * | 11/1993 | Pajtas et al. ............. 152/323 X |
| 5,320,417 A | * | 6/1994 | Trosky .................... 301/5.301 |
| 5,401,037 A | | 3/1995 | O'Donnell et al. |
| 5,470,086 A | | 11/1995 | Peterson et al. |
| 5,560,685 A | * | 10/1996 | De Bortoli ................ 301/5.304 |
| 5,580,093 A | * | 12/1996 | Conway ................... 301/5.301 |
| 5,641,365 A | | 6/1997 | Peterson et al. |
| 5,725,284 A | | 3/1998 | Boyer |
| 5,733,015 A | | 3/1998 | Demarest et al. |
| 6,036,278 A | | 3/2000 | Boyer |
| 6,085,815 A | | 7/2000 | Piper et al. |
| 6,175,196 B1 | | 1/2001 | Ragner et al. |

* cited by examiner

*Primary Examiner*—Russell D. Stormer
(74) *Attorney, Agent, or Firm*—Killworth, Gottman, Hagan & Schaeff, L.L.P.

(57) ABSTRACT

A skate wheel includes an outer polymeric layer, an inner polymeric layer, and an intermediate layer. The inner polymeric layer has a hardness which is less than the hardness of the outer polymeric layer. The inner and outer polymeric layers are preferably comprised of polyurethane. The intermediate layer is made of a hard plastic or metal that extends through the cross-section of the roller wheel, separating the outer and inner layers. The intermediate layer prevents compression of the harder outer polymeric layer onto the softer inner polymeric layer. This provides a smoother ride while maintaining good precision and speed. The skate wheel may also include a decorative illumination device.

21 Claims, 2 Drawing Sheets

SKATE WHEEL

BACKGROUND

The present invention relates to skate wheels, more specifically, the present invention relates to the construction of a skate wheel for devices such as roller skates and skateboards.

Roller skates of various types are well known in the art. The wheels for skates used in outdoor skating have often been constructed of metal, and the wheels of indoor skates have typically been constructed of wood. For recreational activity, skaters often skate on boardwalks, sidewalks, and streets, the surfaces of which may be uneven and bumpy. More experienced skaters may also become involved in sports, such as roller hockey, that require skating with greater precision and speed.

In order to enhance the safe performance of roller skates while maintaining the precision and speed desired, skates have been equipped with polyurethane wheels that are capable of maintaining good traction while the skate is in motion. For example, Peterson et al. U.S. Pat. No. 5,641,365 teaches a skate wheel that has a hard polyurethane hub with a soft polyurethane wheel body.

A drawback associated with these soft wheels is an increase in the amount of rolling resistance. More effort must be expended by the skater to overcome the increased rolling friction, which causes a relative loss of performance, particularly on straightaways. Another disadvantage with softer wheels is their tendency to wear out quickly. Attempts to create a harder wheel have been made, such as in Boyer et al. U.S. Pat. Nos. 5,725,284 and 6,036,278. These patents teach a skate wheel with a nylon hub, a relatively soft polyurethane core and a somewhat harder polyurethane outer body. A problem associated with such a wheel is that the harder outer body compresses against the softer inner body of the wheel and results in a significant distortion in the shape of the wheel and a temporary out of round condition. It will be appreciated that this compression may adversely affect the stability and performance of the skate.

Thus, there is a need in the art for a skate wheel that will facilitate precision and speed, while maintaining a controlled, smooth ride for the skater.

SUMMARY OF THE INVENTION

The present invention meets that need with a skate wheel that provides a smooth ride for the skater, while maintaining good precision and speed. The skate wheel comprises an outer polymeric layer, an inner polymeric layer having a hardness which is less than the hardness of the outer polymeric layer, and an intermediate layer, separating the outer and inner layers. The skate wheel may further include a central hub that is preferably comprised of aluminum. The central hub may be recessed on one side of the inner polymeric layer. The central hub can be flush with the inner polymeric layer, the intermediate layer, and the outer polymeric layer on both sides of the wheel. Typically, the inner and outer polymeric layers comprise polyurethane. Preferably, the inner layer has a Shore A hardness of about 45 to 75. Preferably, the outer layer has a Shore A hardness of about 80 to 95. The intermediate layer typically comprises plastic or metal, wherein the preferred metal is aluminum. The intermediate layer is preferably relatively rigid. The skate wheel may include an illumination device that is typically positioned in the inner layer. Preferably, the outer polymeric layer, the inner polymeric layer, and the intermediate layer are concentric annular layers surrounding a central hub.

The skate wheel of the present invention comprises a generally annular central hub, an inner generally annular polymeric layer surrounding the central hub, a generally annular intermediate layer surrounding the inner polymeric layer, and an outer generally annular layer surrounding the intermediate layer. The outer layer has a hardness which is greater than the hardness of the inner polymeric layer. The generally annular central hub can be recessed on one side. The generally annular central hub may be flush with the generally annular inner polymeric layer, the generally outer polymeric layer, and the generally annular intermediate layer. Typically, the generally annular intermediate layer comprises plastic or metal. The preferred metal for the generally annular intermediate layer is aluminum. The generally annular intermediate layer may be relatively rigid. An illumination device may be positioned in said generally annular inner polymeric layer.

Accordingly, it is a feature of the invention to provide a skate wheel where the hard outer polymeric layer does not compress directly against and distort the shape of the softer inner polymeric layer. This provides a smoother ride for the skater while maintaining good precision and speed. Other variations in the invention will become clear in light of the description below.

DETAILED DESCRIPTION

Figure 1:
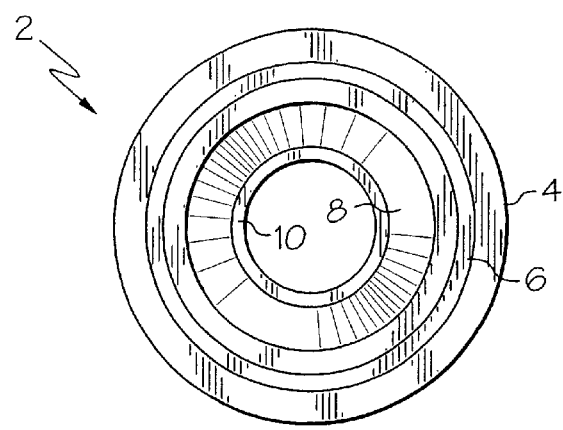
FIG. 1 a side view of the skate wheel according to the present invention.

The present invention is an improved skate wheel that provides a smoother ride for the skater, while maintaining precision and speed. The skate wheel has a hard outer layer, and a soft inner layer. An intermediate layer prevents the outer layer from compressing directly against the soft inner layer of the skate wheel. The invention is best described by referring to the drawings. FIG. 1, shows a side of a skate wheel 2 which has an outer polymeric layer 4, an inner polymeric layer 8, and an intermediate layer 6. The intermediate layer 6 separates the outer polymeric layer 4 and the inner polymeric layer 8.

The outer polymeric layer 4 and inner polymeric layer 8 are preferably made of polyurethane, however, other materials such as natural rubber or any synthetic polymer can be used. The outer diameter of the outer polymeric layer 4 is preferably between 3 inches and 5 inches, and the inner diameter of the outer polymeric layer 4 is preferably between 2.0 inches and 2.5 inches. The outer diameter of the inner polymeric layer 8 is preferably between 1.5 inches and 1.75 inches and the inner diameter of the inner polymeric layer 8 is preferably between 1 inch and 1.25 inches. It is understood that the thickness and dimensions can be varied as wheels vary in size and construction. Thus, the diameters of the layers may change to be larger or smaller than the preferred diameters.

The inner polymeric layer 4 has a hardness that is less than the hardness of the outer polymeric layer 8. Preferably the inner polymeric layer 8 has a Shore A hardness between about 45 and 75. The outer polymeric layer 4 preferably has a Shore A hardness between about 80 and 95. It will be appreciated that the hardness of the polymeric layers can be adjusted as desired to alter the performance characteristics of the wheel 2. In any event, however, the inner polymeric layer 8 is selected to be softer than the outer polymer layer 4. The harder outer polymer layer 4 of the skate wheel 2 provides the rider with good precision and speed, minimizing the rolling friction of the skate wheel.

The intermediate layer 6 can be made from any material that will prevent the outer polymeric layer 4 from distorting in shape significantly, going out of round, and compressing the inner polymeric 8. Preferably, the intermediate layer 6 is made of metal or plastic. The preferred metal for the intermediate layer 6 is aluminum. The intermediate layer 6 extends across the width of wheel 2, completely separating the outer polymeric layer 4 from the inner polymeric layer 8. By separating the outer and inner polymeric layers 4, 8 the harder outer polymeric layer 4 is prevented from compressing against the softer inner polymeric layer 8, thus providing a smoother ride. The intermediate layer 6 is relatively rigid and can be configured as an annulus having smooth inner and outer cylindrical surfaces. Alternatively ridges, either circumferential or axial, may be defined in the inner and outer surfaces of the intermediate layer 6. Typically, weight can be reduced from the intermediate layer 6 by including such ridges, as they add to the load bearing capability of layer 8. The ridges can be placed in any desirable manner, such as axially, circumferentially, or randomly.

The skate wheel 2 also preferably includes a central hub 10. The central hub 10 is typically arranged to be rotated on an axle (not shown) that is attached to a roller skate, skateboard, or other wheeled object. The central hub 10 also provides support for the outer, intermediate, and inner layers 4, 6, and 8. The hub 10 is preferably made of aluminum, but it can also be made of any material that is relatively rigid and that will provide good load support.

Figure 2:
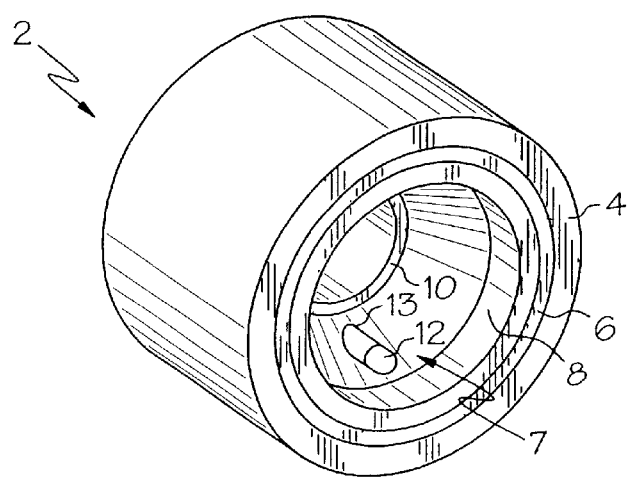
FIG. 2 is a perspective view of the skate wheel, illustrating an illumination device.
Figure 3:
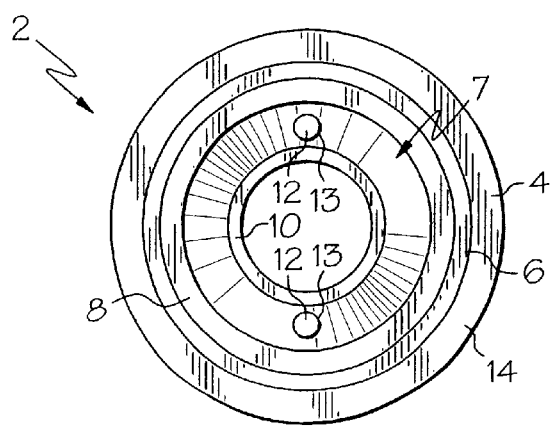
FIG. 3 a side view of the skate wheel, illustrating the recessed inner polymeric layer.

As seen in FIGS. 2 and 3, the skate wheel layers 4, 6, and 8 are generally annular, and are concentric. Layers 4, 6, and 8 are permanently secured or bonded together so that separation is virtually impossible. The layers 4 and 8 are injection molded over intermediate layer 6 and the hub 10 to secure the parts together. Preferably, the inner polymeric layer 8 is molded initially with hub 10 and intermediate layer 6. Then, the outer polymer layer 4 is molded around the intermediate layer 6.

Preferably, the central hub 10 is not as wide as layers 4, 6, and 8 and does not extend the entire width of the skate wheel 2. The inner polymeric layer 8 of the skate wheel 2 may be recessed inward toward the center of the skate wheel 2. The central hub 10 bonds to the inner polymeric layer 8 from the center of the skate wheel 2 and extends through the remaining portion of the inner polymeric layer 8. The central hub 10 can be flush with layers 4, 6, and 8 on one side of the skate wheel 2 (shown in FIG. 4), then the central hub 10 is recessed on the opposite side of the skate wheel 2, thereby leaving a recessed area 7 on the surface of the inner polymeric layer 8. It is possible, of course, for the central hub 10 to be recessed on both sides of the skate wheel 2 or to extend completely through the circumference of the inner polymeric layer 8 so that the central hub 10 is flush with the layers 4, 6, and 8 on both sides of the skate wheel 2. The central hub 10 may even extend past the layers 4, 6, and 8 so that the central hub 10 is protruding from the center of the skate wheel 2.

The recessed area 7 can be utilized to enhance the appearance of the skate wheel 2 by providing a place for mounting decorative items, such as an illumination device, within the inner polymeric layer 8. The illumination device 12 preferably comprises one or more battery-operated lights that are fixed within a groove 13 created during the molding of the inner polymeric layer 8. The illumination device 12 may be removable so that the device can be replaced as needed. Although the illumination device 12 is shown in the recessed area 7 of the inner polymeric layer, it should be appreciated that the illumination device 12 can be mounted elsewhere on the skate wheel 2.

Figure 4:
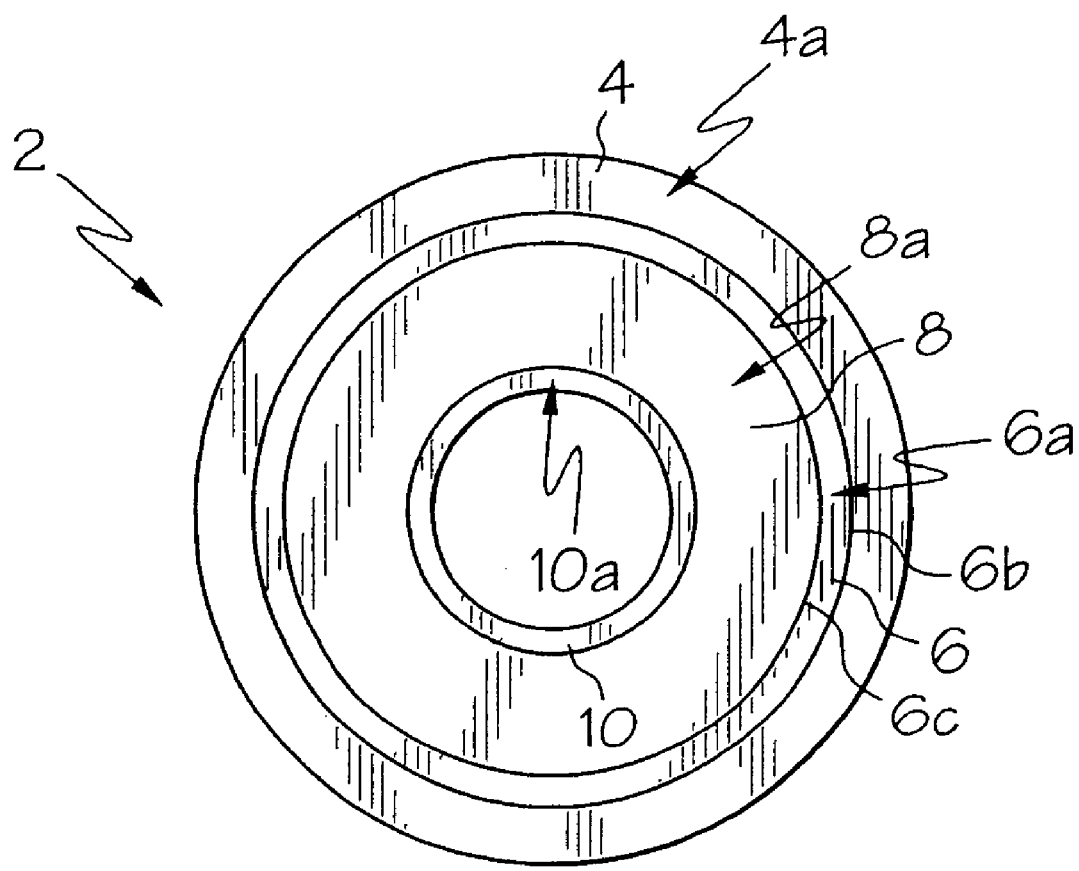
FIG. 4 is a side view of a skate wheel showing all the outer layers flush with one another according to one embodiment of the present invention.

Referring to FIG. 4, a side of a skate wheel 2 is shown which has an outer polymeric layer 4 having an outer surface 4a, an inner polymeric layer 8 having an outer surface 8a, an intermediate layer 6 having an outer surface 6a, and a hub 10 having an outer surface 10a. The outer surfaces 4a, 6a, 8a, and 10a are flush with one another on that particular side. The intermediate layer 6 has a smooth inner cylindrical surface 6b and a smooth outer cylindrical surface 6c that separates the outer polymeric layer 4 and the inner polymeric layer 8.

What is claimed is:

1. A skate wheel comprising:
   an outer polymeric layer, having an outer surface;
   an inner polymeric layer having a hardness which is less than the hardness of said outer polymeric layer, having an outer surface;
   a metallic intermediate layer, having an outer surface, completely separating said outer polymeric layer from said inner polymeric layer; and
   a central hub surrounded by said inner polymeric layer, wherein said outer surfaces of said outer polymeric layer, said inner polymeric layer, and said intermediate layer are flush on at least one side of said skate wheel
   wherein said hub is flush with at least one of said outer surfaces.

2. A skate wheel as claimed in claim 1, wherein said central hub is recessed on a side of said skate wheel.

3. A skate wheel as claimed in claim 1, wherein said central hub is flush with said outer surfaces of said inner polymeric layer, said intermediate layer, and said outer polymeric layer.

4. A skate wheel as claimed in claim 1, wherein said central hub comprises aluminum.

5. A skate wheel as claimed in claim 1, wherein said inner polymeric layer comprises polyurethane.

6. A skate wheel as claimed in claim 1, wherein said outer polymeric layer comprises polyurethane.

7. A skate wheel as claimed in claim 1, wherein said inner layer has a Shore A hardness of about 45 to 75.

8. A skate wheel as claimed in claim 1, wherein said outer layer has a Shore A hardness of about 80 to 95.

9. A skate wheel as claimed in claim 1, wherein said intermediate layer comprises plastic or metal.

10. A skate wheel as claimed in claim 9, wherein said metal is aluminum.

11. A skate wheel as claimed in claim 10, wherein said illumination device is positioned in said inner layer.

12. A skate wheel as claimed in claim 1, wherein said intermediate layer comprises a smooth inner cylindrical surface and a smooth outer cylindrical surface.

13. A skate wheel as claimed in claim 1, wherein said intermediate layer is rigid.

14. A skate wheel as claimed in claim 1, further including an illumination device.

15. A skate wheel as claimed in claim 1, wherein said outer polymeric layer, said inner polymeric layer, and said intermediate layer form annular layers around a central hub.

16. A skate wheel comprising:

a generally annular central hub;

an inner generally annular polymeric layer surrounding said central hub;

a generally annular intermediate layer surrounding said inner polymeric layer; and an outer generally annular layer surrounding said intermediate layer, said outer layer having a hardness which is greater than the hardness of said inner polymeric layer, wherein said generally annular central hub, said generally annular inner polymeric layer, said generally outer polymeric layer, and said generally annular intermediate layer are flush on a first side of said skate wheel, and wherein said generally annular central hub is recessed on a second side of said skate wheel.

17. A skate wheel as claimed in claim 16, wherein said generally annular intermediate layer comprises plastic or metal.

18. A skate wheel as claimed in claim 17, wherein said metal is aluminum.

19. A skate wheel as claimed in claim 16, wherein said generally annular intermediate layer comprises a smooth inner cylindrical surface and a smooth outer cylindrical surface.

20. A skate wheel as claimed in claim 16, wherein said generally annular intermediate layer is rigid.

21. A skate wheel as claimed in claim 16, further including an illumination device positioned in said generally annular inner polymeric layer.

* * * * *

UNITED STATES PATENT AND TRADEMARK OFFICE
CERTIFICATE OF CORRECTION

PATENT NO. : 6,592,189 B1
DATED : July 15, 2003
INVENTOR(S) : Forest H. Back Sr.

It is certified that error appears in the above-identified patent and that said Letters Patent is hereby corrected as shown below:

<u>Column 2,</u>
Line 28, "Fig. 1 a side view" should be -- Fig. 1 is a side view --; and
Line 32, "Fig. 3 a side view" should be -- Fig. 3 is a side view --.

Signed and Sealed this

Twenty-seventh Day of January, 2004

JON W. DUDAS
*Acting Director of the United States Patent and Trademark Office*